US012346146B2

(12) United States Patent
Semegen et al.

(10) Patent No.: US 12,346,146 B2
(45) Date of Patent: Jul. 1, 2025

(54) SYSTEM AND METHOD FOR COUNTING SPATIALLY ARRANGED, MOVING MARKERS

(71) Applicant: HEAVY KINEMATIC MACHINES SP. Z O. O., Komorowo (PL)

(72) Inventors: Mateusz Semegen, Komorowo (PL); Rafal Kasperowicz, Komorowo (PL); Maciej Rot, Komorowo (PL); Kacper Ostrowski, Komorowo (PL)

(73) Assignee: HEAVY KINEMATIC MACHINES SP. ZO. O., Komorowo (PL)

( * ) Notice: Subject to any disclaimer, the term of this patent is extended or adjusted under 35 U.S.C. 154(b) by 433 days.

(21) Appl. No.: 17/797,444

(22) PCT Filed: Dec. 9, 2020

(86) PCT No.: PCT/EP2020/085383

§ 371 (c)(1),
(2) Date: Aug. 4, 2022

(87) PCT Pub. No.: WO2021/155979

PCT Pub. Date: Aug. 12, 2021

(65) Prior Publication Data

US 2022/0390978 A1 Dec. 8, 2022

(30) Foreign Application Priority Data

Feb. 4, 2020 (EP) .................................... 20461509

(51) Int. Cl.
*G06C 15/04* (2006.01)
*A63B 21/062* (2006.01)

(52) U.S. Cl.
CPC .......... *G06C 15/04* (2013.01); *A63B 21/0628* (2015.10); *A63B 2220/13* (2013.01); *A63B 2225/54* (2013.01)

(58) Field of Classification Search
CPC . G06C 15/04; A63B 21/0628; A63B 2220/13; A63B 2225/54; A63B 2225/15; A63B 2225/20; A63B 21/062–0632; G06D 3/00
See application file for complete search history.

(56) References Cited

U.S. PATENT DOCUMENTS 6,793,607 B2 * 9/2004 Neil ..................... A63B 21/063 482/8
9,884,224 B2 * 2/2018 Spoeth, Jr. ....... A63B 23/03566
(Continued)

FOREIGN PATENT DOCUMENTS

CN 108096768 A * 6/2018
CN 106267732 B 6/2019
EP 3542874 A1 * 9/2019 ......... A63B 21/0628

*Primary Examiner* — Nyca T Nguyen
(74) *Attorney, Agent, or Firm* — Rivka Friedman

(57) ABSTRACT

A method for counting spatially arranged, moving markers, the markers being arranged to move along a movement axis parallel to a sensors axis of sensors for detecting the markers during movement. The number of sensors is lower than the number of markers in order to decrease the cost of the sensors system. The present system supports stacks having objects, associated with the markers, of different sizes (such as weight plates of increasing height) or different weights.

13 Claims, 8 Drawing Sheets

(56) References Cited

U.S. PATENT DOCUMENTS

| | | | | |
|---|---|---|---|---|
| 2007/0213183 | A1* | 9/2007 | Menektchiev ..... | A63B 21/0628 482/8 |
| 2008/0242509 | A1* | 10/2008 | Menektchiev ..... | A63B 21/0552 482/99 |
| 2012/0220429 | A1* | 8/2012 | Yoshida ............. | A63B 71/0686 482/8 |
| 2020/0070001 | A1* | 3/2020 | Malis ................. | A63B 24/0062 |
| 2021/0220704 | A1* | 7/2021 | Claudio ............. | A63B 21/0058 |

* cited by examiner

| | | Initial number of markers | | |
|---|---|---|---|---|
| | | ($MN_U$) | ($MN_O$) | ($MN_A$) |
| | (MC) | | | |
| $S_0$ | 0 | 11 | 0 | 0 |
| $S_1$ | 0 | 11 | 0 | 0 |
| $S_2$ | 0 | 11 | 0 | 0 |
| $S_3$ ($S_{T-1}$) | 0 | 11 | 0 | 0 |
| $S_4$ ($S_T$) | 0 | 11 | 0 | 0 |
| $S_5$ | 0 | 9 | 0 | 2 |
| $S_6$ | 0 | 5 | 0 | 6 |
| $S_7$ | 0 | 2 | 1 | 7 |
| $S_8$ | 0 | 0 | 0 | 11 |

| | | Initial number of markers | | |
|---|---|---|---|---|
| | (MC) | $(MN_u)$ | $(MN_o)$ | $(MN_A)$ |
| $S_0$ | 0 | 11 | 0 | 0 |
| $S_1$ | 0 | 11 | 0 | 0 |
| $S_2$ | 0 | 11 | 0 | 0 |
| $S_3$ $(S_{T-1})$ | 0 | 11 | 0 | 0 |
| $S_4$ $(S_T)$ | 1 | 11 | 0 | 0 |
| $S_5$ | 2 | 9 | 0 | 2 |
| $S_6$ | 0 | 5 | 0 | 6 |
| $S_7$ | 0 | 2 | 1 | 7 |
| $S_8$ | 0 | 0 | 0 | 11 |

| | | Initial number of markers | | |
|---|---|---|---|---|
| | | ($MN_U$) | ($MN_O$) | ($MN_A$) |
| | (MC) | | | |
| $S_0$ | 0 | 11 | 0 | 0 |
| $S_1$ | 0 | 11 | 0 | 0 |
| $S_2$ | 0 | 11 | 0 | 0 |
| $S_3$ ($S_{T-1}$) | 1 | 11 | 0 | 0 |
| $S_4$ ($S_T$) | 4 | 11 | 0 | 0 |
| $S_5$ ($S_B$) | 4 | 9 | 0 | 2 |
| $S_6$ | 0 | 5 | 0 | 6 |
| $S_7$ | 0 | 2 | 1 | 7 |
| $S_8$ | 0 | 0 | 0 | 11 |

| Sensor | Following markers | Preceding markers | Facing markers |
|---|---|---|---|
| S1_1 | 0 | 16 | 0 |
| S1_2 | 0 | 16 | 0 |
| S1_3 | 2 | 14 | 0 |
| S1_4 | 4 | 12 | 0 |
| S1_5 | 6 | 10 | 0 |
| S2_1 | 8 | 8 | 0 |
| S2_2 | 10 | 6 | 0 |
| S2_3 | 12 | 4 | 0 |
| S2_4 | 14 | 2 | 0 |
| S2_5 | 15 | 0 | 1 |

| | |
|---|---|
| Number of sensors | 10 |
| Number of markers | 16 |
| Distance between consecutive sensors | 10 |
| Distance between consecutive markers | 5 |
| Object weight | 10000 |
| List of weights | List_W |
| List of heights | List_H |

SYSTEM AND METHOD FOR COUNTING SPATIALLY ARRANGED, MOVING MARKERS

TECHNICAL FIELD

The present invention relates to a system and method for counting spatially arranged, moving markers positioned on corresponding objects. In particular, the present invention relates to a system for counting markers, present in a moving group, by sensors for detecting weight of at least one weight stack plate moved in a given weightlifting machine.

BACKGROUND OF THE INVENTION

Prior art of "Sensor arrays for exercise equipment and methods to operate the same" US 20070213183 A1, discloses a linear array of sensors. The array of sensors includes a plurality of sensors positioned adjacent and opposite the resting position of each weight plate, and at equally spaced locations above the example stack of weights up to the highest travel position attainable by the top weight plate of the example stack of weights. The example sensor array is enclosed in, covered and/or attached to any variety of housing and/or mounting bracket.

A drawback of this solution is that there must be present a lot of sensors wherein the number of sensors greatly exceeds the number of weight plates because the sensors must extend up to the highest travel position attainable by the top weight plate.

Therefore, due to the number of required sensors this solution is also ineffective with relation to cost.

There have been attempts to mitigate this problem so that the number of sensors is lower than the number of weight plates in order to decrease the cost of the sensors system.

Further, the lower the number of required sensors the lower power consumption of the entire system, which is often battery powered.

Such solution is present in EP3542874 entitled "System and method for assisting a weightlifting workout" describes a system where distances between the sensors are set during mounting and setup and are fixed for a given weight stack device. Nevertheless, these distances are a multiplication of a height of a single weight plate, for example four weight plates distance equals 10 cm for a weight plate having 2.5 cm height.

A disadvantage of this solution is that it cannot immediately detect a moved weight because a weight stack must be moved (typically lifted) by a distance (typically height) equal to a spread of sensors so that one may determine how many markers (weight plates) have been moved.

There is also a problem arising from the fact that different weight stacks having different weight plate sizes will require different rails of sensors where such sensors have different spacing.

Such system is also not suitable to support weight stacks having weight plates of different sizes (e.g. weight plates of increasing height).

It would be advantageous to present a solution where the aforementioned drawbacks would be obviated.

The aim of the development of the present invention is therefore an improved and cost effective system and method counting spatially arranged, moving markers.

SUMMARY AND OBJECTS OF THE PRESENT INVENTION

An object of the present invention is a method for counting spatially arranged, moving markers wherein said markers are arranged to move along a movement axis being parallel to a sensors axis of sensors configured to detect said markers during movement, whereas there are fewer sensors than markers, the method being characterized in that it comprises the steps of: providing information on a number of markers; providing information on a sequence of said sensors; providing information on an initial setup of the system by specifying how many markers are preceding and following each sensor taking into account the axis of movement and a direction of an engaging movement; arranging said sensors, in said initial setup, such that at least two of the sensors are arranged such that all the markers precede them taking into account the axis of movement and said direction of the engaging movement; determining a sensor $S_T$ having 0 following markers and a sensor $S_{T-1}$ following the $S_T$ sensor in the direction of the engaging movement; awaiting detection of a marker by the sensor $S_{T-1}$; determining a sensor $S_B$ closest to the starting sensor taking into account said direction of an engaging movement and at the same time having more than 0 detected markers; verifying whether the $S_B$ sensor is the starting sensor and in case it is not, determining a number of moved markers as a sum of detected markers and following markers for the $S_B$.

Preferably, the method further comprises the steps of: in the case the verifying step is positive, setting a variable H as a sum of predefined heights of objects associated with said markers preceding the starting sensor based on the number of markers preceding the starting sensor as well as the number of markers counted by the starting sensor; determining a sensor $S_{TT}$ as the closest sensor following $S_T$–H; and awaiting detection of a marker by the sensor $S_{TT}$.

Preferably, said number of moved markers is increased by 1 when the $S_B$ is facing a marker.

Preferably, said information on an initial setup of the system comprises a list defining heights of all objects associated with said markers.

Preferably, said information on an initial setup of the system comprises a list defining weights of all objects associated with said markers whereas after said verifying step the method is configured to provide a total weight as a sum of weight of all objects associated with said moved markers.

Preferably, the method further comprises a step of awaiting a return of the weight plates to the initial position and increasing a counter of repetitions.

Preferably, said information on an initial setup of the system further comprises information on whether each sensor is facing a marker.

Preferably, said sensors are mounted on at least one rail being configured to be connectable to other such rails in order to form longer rails along said sensors axis.

Another object of the present invention is a computer program comprising program code means for performing all the steps of the computer-implemented method according to the present invention when said program is run on a computer.

Another object of the present invention is a computer readable medium storing computer-executable instructions performing all the steps of the computer-implemented method according to the present invention when executed on a computer.

Another object of the present invention is a system for counting spatially arranged, moving markers wherein said markers are arranged to move along a movement axis being parallel to a sensors axis of sensors configured to detect said markers during movement, whereas there are fewer sensors than markers, the system being characterized in that: a configuration stored in a memory comprises: information on a number of markers; information on a sequence of said sensors; information on an initial setup of the system by specifying how many markers are preceding and following each sensor taking into account the axis of movement and a direction of an engaging movement; at least two of the sensors are arranged in said initial setup, such that all the markers precede them taking into account the axis of movement and the direction of the engaging movement; a controller configured to execute the steps of: determining a sensor $S_T$ having 0 following markers and a sensor $S_{T-1}$ following the $S_T$ sensor in the direction of the engaging movement; awaiting detection of a marker by the sensor $S_{T-1}$; determining a sensor $S_B$ closest to the starting sensor taking into account said direction of an engaging movement and at the same time having more than 0 detected markers; verifying whether the $S_B$ sensor is the starting sensor and in case it is not, determining a number of moved markers as a sum of detected markers and following markers for the $S_B$.

Preferably, one of said sensors is arranged facing or preceding a first marker being the starting marker in said spatially arranged group of markers taking into account a direction of an engaging movement.

Preferably, said sensors are arranged on at least two connected rails arranged along the sensors axis wherein each rail is configured to provide a report to the controller wherein such report comprises sensors identifiers and sensors sequence.

Preferably, said controller is physically separated from said rails.

Preferably, said controller is further configured to execute the steps of: in the case the verifying step is positive, setting a variable H as a sum of predefined heights of objects associated with said markers preceding the starting sensor based on the number of markers preceding the starting sensor as well as the number of markers counted by the starting sensor; determining a sensor $S_{TT}$ as the closest sensor following position $S_T$–H; and awaiting detection of a marker by the sensor $S_{TT}$.

BRIEF DESCRIPTION OF THE DRAWINGS

These and other objects of the invention presented herein, are accomplished by providing a counting spatially arranged, moving markers. Further details and features of the present invention, its nature and various advantages will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as “processing” or “creating” or “transferring” or “executing” or “determining” or “detecting” or “obtaining” or “selecting” or “calculating” or “generating” or the like, refer to the action and processes of a computer system that manipulates and transforms data represented as physical (electronic) quantities within the computer’s registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term “example” means serving as a non-limiting example, instance, or illustration. As utilized herein, the terms “for example” and “e.g.” introduce a list of one or more non-limiting examples, instances, or illustrations.

DESCRIPTION OF EMBODIMENTS

The system and method according to the present invention take into account that a sequence of sensors is known wherein the system comprises at least two sensors arranged along an axis parallel to an axis of movement of corresponding markers positioned on weight plates (or objects in general).

Figure 1A:
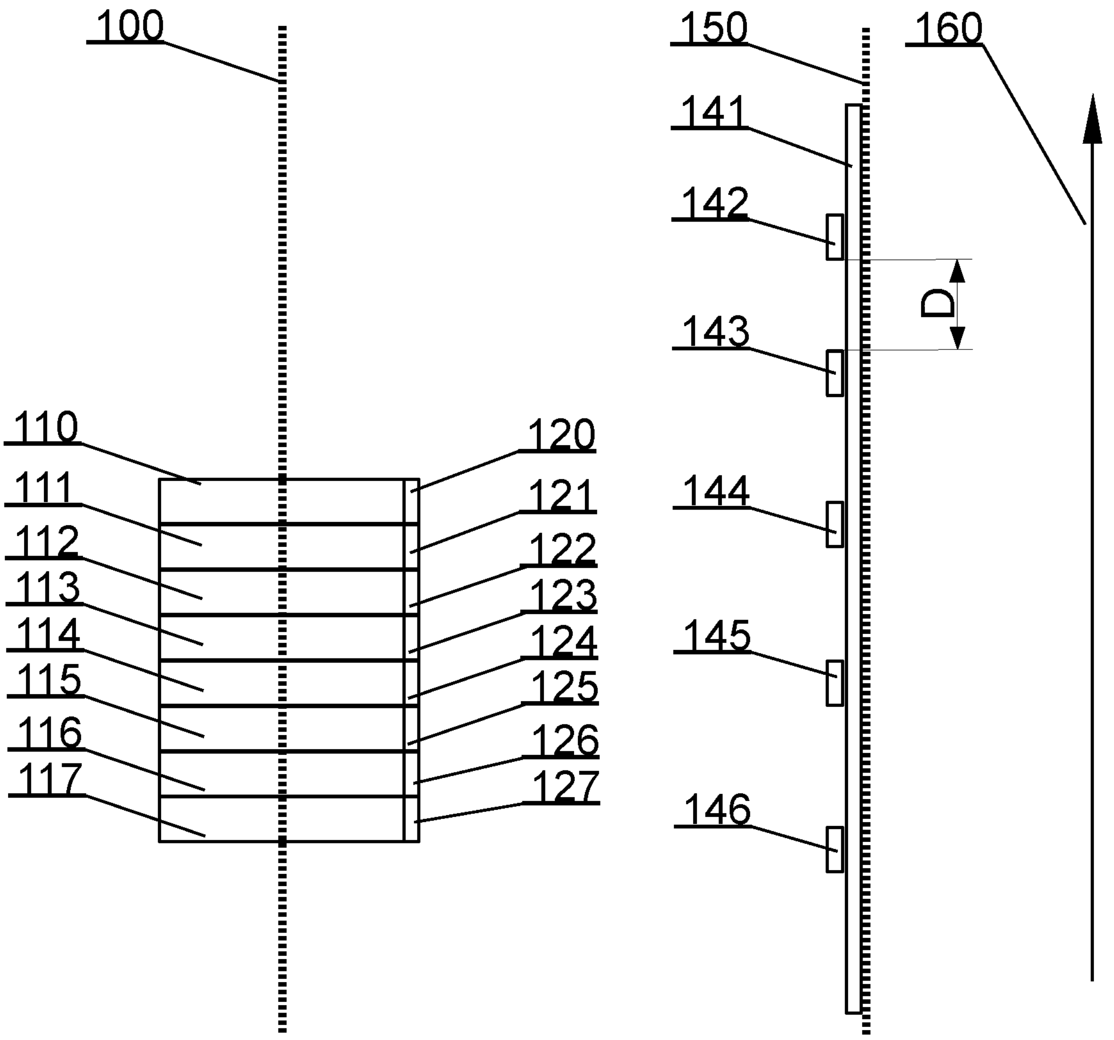
FIG. 1A presents a basic configuration of the present system.

FIG. 1A presents a basic configuration of the present system wherein there is an axis of movement (100) positioned vertically, along which weight plates (110-117) are configured to be moved. This mechanical arrangement is not shown but is evident to a person skilled in the art of weightlifting machines. Upon exertion of a force the weight plates are configured to be moved along the movement axis (in an engaging direction) and return back typically due to gravity forces (in a returning direction being opposite to the engaging direction).

Each weight plate (110-117) has a corresponding marker (120-127) configured to be detected by a suitable sensor (142-146) when such marker passes a detection area covered by such sensor. The number of weight plates (110-117) is known and is a parameter of the system provided by means of defining a sequence of sensors (142-146). Typically, the markers (120-127) are facing the corresponding sensors (142-146).

The sensors (142-146) are positioned along an axis parallel (150) to the axis of movement (100). For the ease of mounting, the sensors (142-146) may be positioned on a suitable rail (141), which might house typical components such as power lines, data lines, a controller chip etc, which are typical modules allowing such sensors (142-146) to operate.

The rail (141) may be made of a relatively rigid material such as hard plastic in order to protect the sensors (142-146) and components mounted therein.

The rail (141) may also function as an element maintaining a fixed positioning of the sensors (142-146), which is beneficial for a purpose of mounting the sensors (142-146) on a target weight stack device.

Such rails (141) may be manufactured in one size (e.g. 100 cm) or in several basic sizes (e.g. 25 cm, 50 cm and 100 cm) and optionally comprise a connector (at one or both of its ends) so that the rails (141) may be connected an operate as a single system.

Figure 2:
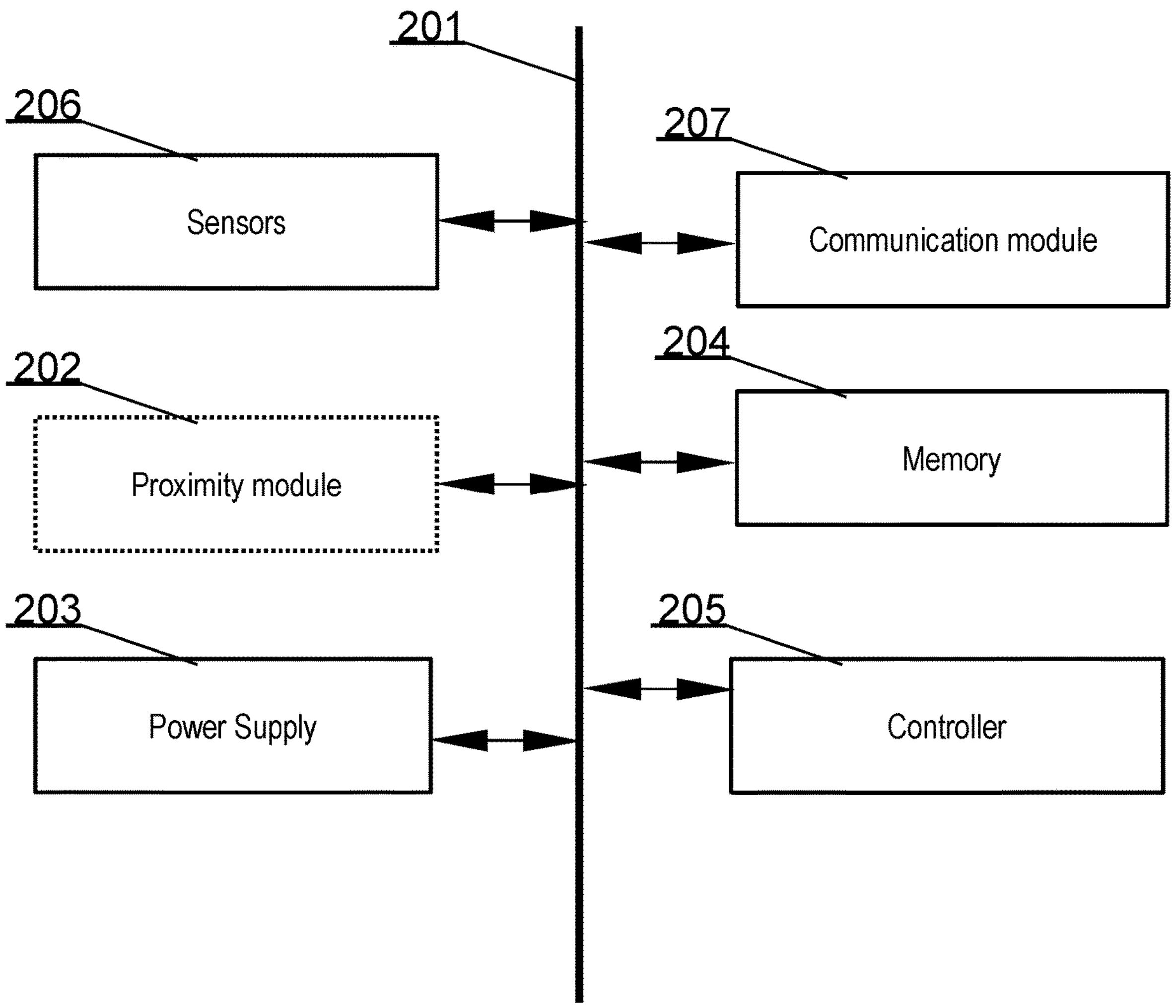
FIG. 2 presents a diagram of the system according to the present invention.

In case of connectable rails (141), each rail (141) may comprise its own controller in order to form a system as shown in FIG. 2 or the controller may be separated and configured to control a plurality of such rails (141). Connected rails (141) may also have a common power source.

To this end, each rail (141) is aware of its sensors (142-146) and may provide a report to a controller wherein such report comprises sensors identifiers, sensors sequence and preferably a length of the rail (141). Based on this, a controller may correctly identify sensors (142-146) from different rails (141) and act in view of system configuration as explained above.

The sequence of sensors (142-146) is known (in this case 5) and the distance D between consecutive sensors is also known. The distance D need not be a multiple of a height of each weight plate (110-117) and thus allows having weight plates (110-117) of different heights on the same weight stack.

The system assumes a known configuration of said system at rest (i.e. an initial position of the markers (120-127) with respect to the sensors (142-146)). In particular, it is known how many markers (120-127) are positioned prior to (preceding markers) and after (following markers) each sensor taking into account the axis of movement (100) and the direction of the engaging movement (160). In other words, the present system does not need to be aware of exact positions of respective markers (weight plates).

Usually the markers (120-127) move in a subgroup as not all weight plates (110-117) are typically lifted. Nevertheless, in rare cases all markers (120-127) will move.

In another embodiment of the present invention, the distance D between consecutive sensors may differ, but it must be known to the system in relation to all consecutive sensor pairs.

In yet another example, there is not present the requirement for it to be known a'priori how many markers (110-117) are positioned prior to and after each sensor taking into account the axis of movement (100). In such a case there must be known a distance M between markers (e.g. between centre points of such markers). This is useful because based on these distances (i.e. distances between consecutive sensors, distances between consecutive markers, marker size) the system may determine how many markers (120-127) are positioned prior to and after each sensor taking into account the axis of movement (100) and the direction of the engaging movement (160).

Figure 5:
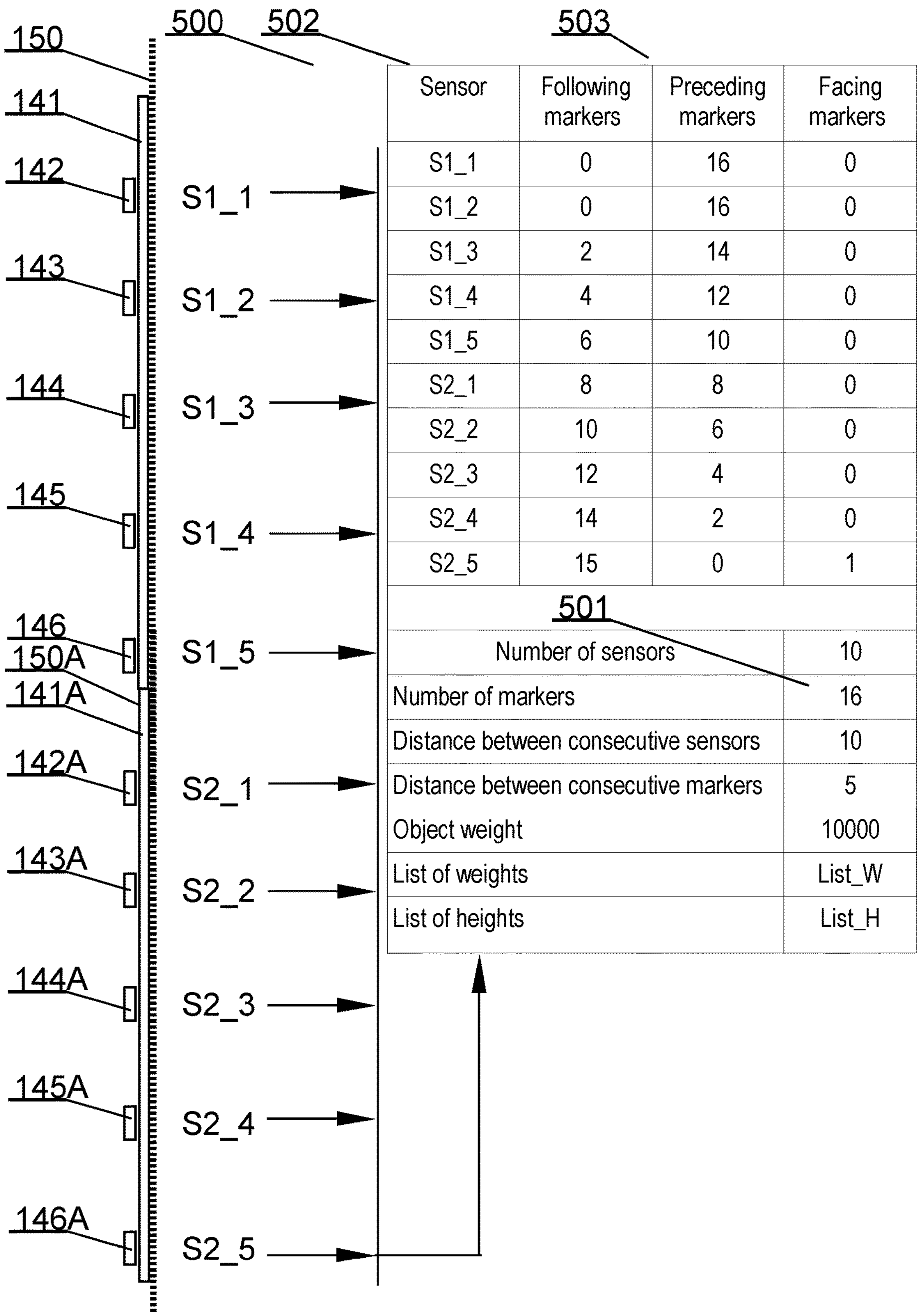
FIG. 5 shows example of an initial system configuration stored in memory.

Nevertheless, this embodiment is less preferred than the first embodiment defining (as a configuration, example of which is shown in FIG. 5) exactly how many markers (120-127) are positioned prior to (preceding markers) and after (following markers) each sensor taking into account the axis of movement (100).

In a preferred embodiment, the markers (120-127) are positioned between the starting sensor ((146) as shown in FIG. 1A) and an ending sensor (142) taking into account a direction of an engaging movement (160). Further, the preferred embodiment has two ending sensors (142, 143), taking into account said direction of an engaging movement (160), following the weight stack at rest i.e. all weight plates (110-117) with markers (120-127).

Figure 1B:
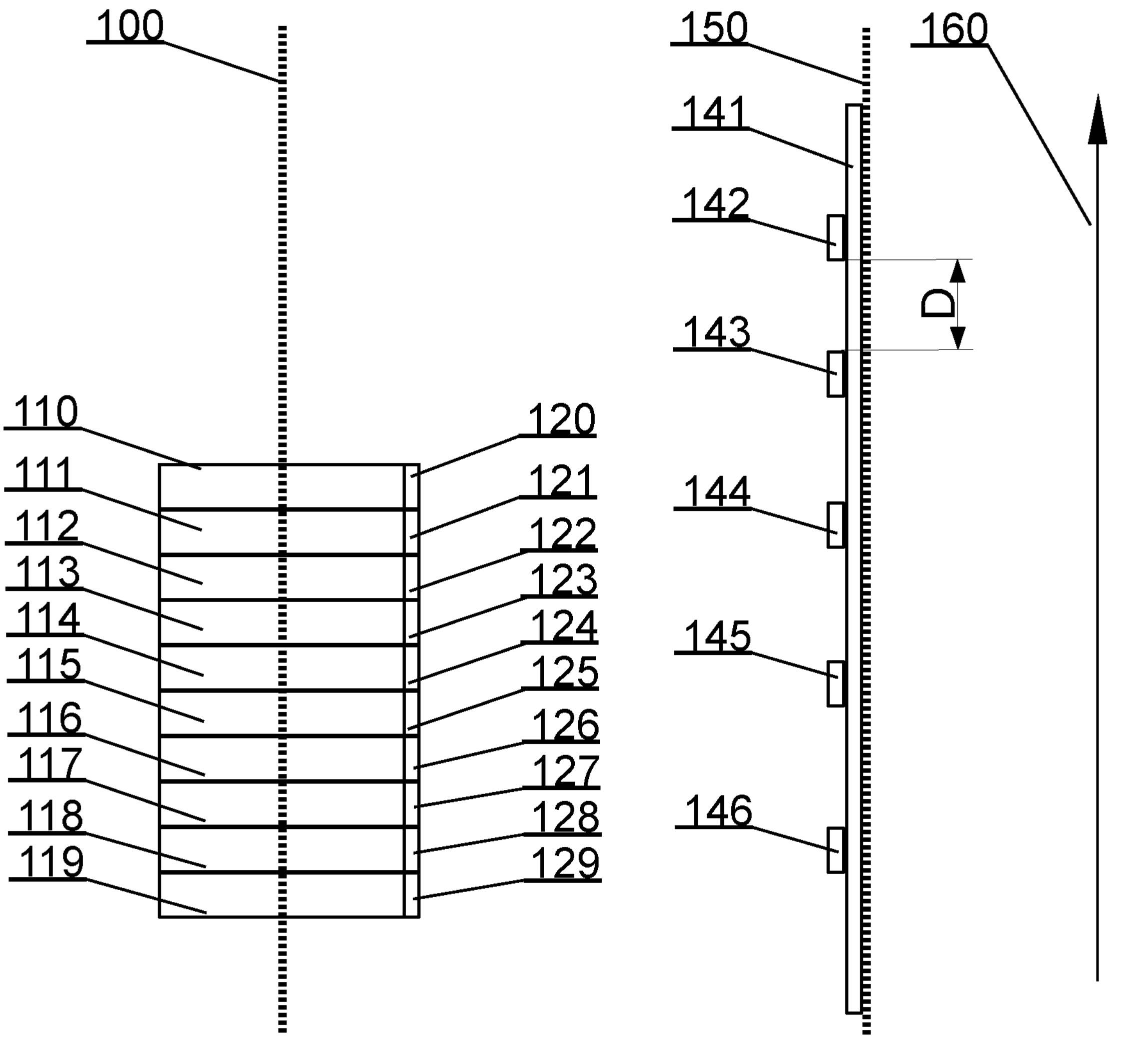
FIG. 1B presents another configuration of the present system.
Figure 3:
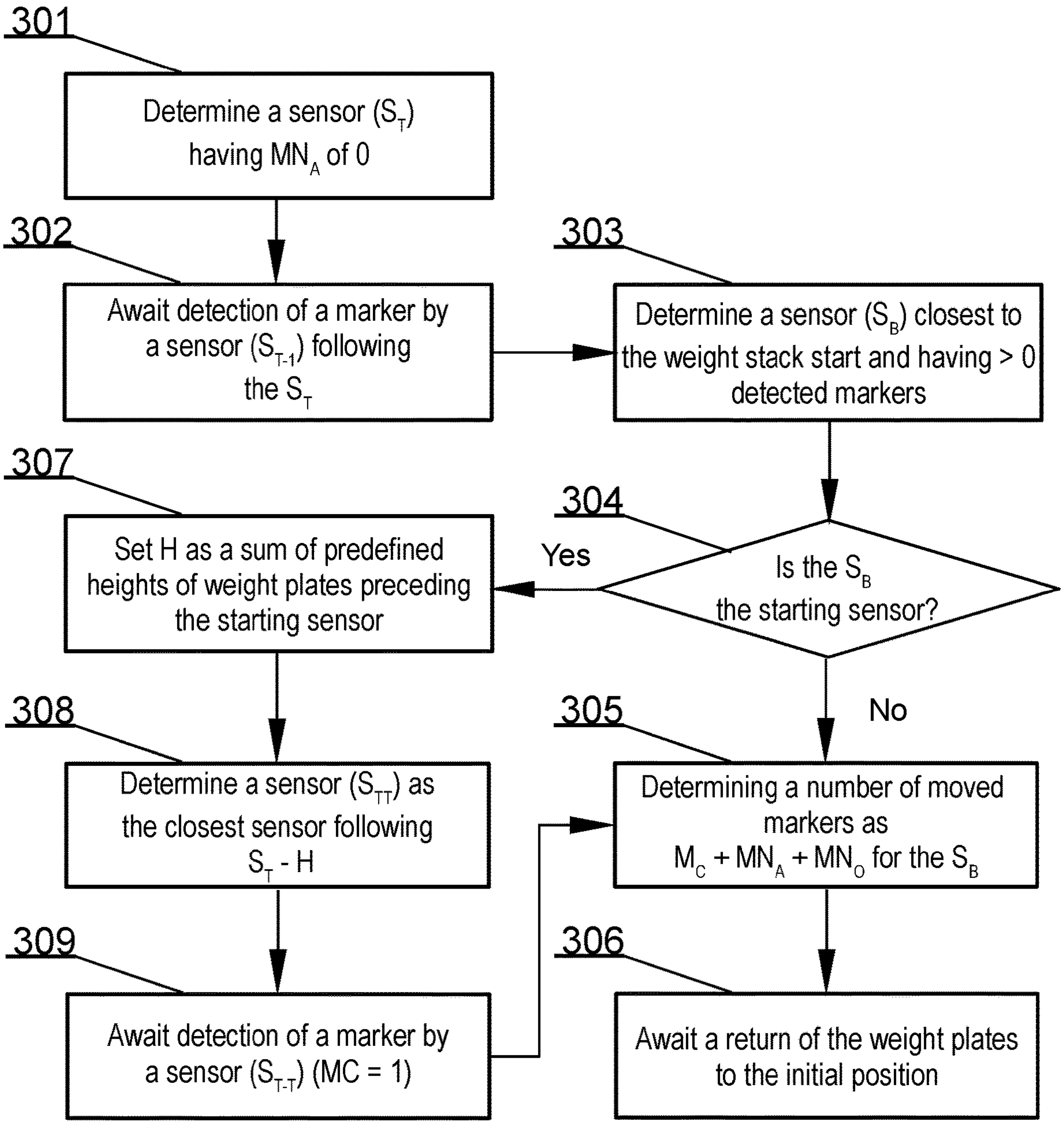
FIG. 3 presents a diagram of the method according to the present invention.

In an alternative embodiment, the markers (120-129) may be positioned also below (preceding) the starting sensor (146) taking into account said direction of an engaging movement (160) as shown in FIG. 1B. In such case the method according to the present invention must be modified as shown in FIG. 3 (steps (307-309) and take into account that a weight stack must be moved by a distance greater than a distance D between the sensors.

Correspondingly, a starting marker (127 in FIG. 1A and 129 in FIG. 1B) is considered being the last marker in a spatially arranged group of markers (120-127, 120-129) taking into account a direction of an engaging movement (160).

As an example, in case of a vertical weight stack having an engaging motion of markers directed upwards, the starting sensor is the one positioned lowest (146) while the starting marker is the last marker (127 in FIG. 1A) i.e. a weight stack starting marker. In case of left of right oriented direction of the engaging motion, these naming definitions have to be modified accordingly.

The present solution eliminates a need of adjusting the sensors (142-146) setup (typically on the rail (141) to the sizes of the weight plates (110-117) as well as allows use of the system on weight stack machines using different weight plates (110-117) of differing weights and/or heights.

Said adjusting process is meant as eliminating a need of physical adjusting because there is still present a configuration in the applicable parameters stored in memory of the system.

Another advantage of the present system is that the mounting of the system on a weight stack machine need not be very precise as in case of prior art systems. This is a result of a focus of the present solution on relative positioning between the sensors (142-146) and the markers (120-129) and not on their absolute positioning.

As will be described later, the present method minimizes a travel distance required in order to detect a number of lifted weight plates (110-117) comprising said markers (120-127).

FIG. 1B shows another setup of the present system, in which the number of weight plates has been increased (110-119) while keeping the same rail (141) and the number of sensors (142-146).

FIG. 2 presents a diagram of the system according to the present invention. The system is a typically mounted within said rail (141).

The system may be realized using dedicated components or custom made FPGA or ASIC circuits. The system comprises a data bus (201) communicatively coupled to a memory (204). Additionally, other components of the system are communicatively coupled to the system bus (201) so that they may be managed by a controller (205).

The memory (204) may store computer program or programs executed by the controller (205) in order to execute steps of the method according to the present invention. It may also store any configuration parameters as explained above and further with reference to FIG. 5.

The sensors (206) may be powered from a battery of from the mains via a power supply (203). The controller (205) will usually be configured to provide data, via a communication module (207), to an external device such as a smartphone, which may also be used to setup and control the system.

Optionally, the system may comprise a proximity module (202) such as an RFID (or Bluetooth LE) sensor, that may be used in order to identify particular users operating the system. Such user may be identified using a smartphone comprising an RFID functionality or a suitable workout garment, such as a glove, comprising an RFID functionality configured to identify a particular user. Based on such identification a connection may be set up with an application executed on such user's device e.g. smartphone, tablet etc.

As already explained, the system may optionally comprise connected rails (141) arrangement that form the sensors module (206) in case two or more rails (141) of sensors (142-146) are connected.

FIG. 3 presents a diagram of the method according to the present invention. The described process uses the following variables that are set up prior to invoking the procedure:

- $MN_A$—initial number of markers after a given sensor taking the direction of movement into account;
- $MN_U$—initial number of markers preceding a given sensor taking the direction of movement into account;
- $MN_O$—initial presence of a marker in front of a given sensor (0 or 1/true or false); (this parameter is optional since a system may be configured such that none of the markers are facing any sensor, however having this parameter gives more precision and flexibility);
- $M_C$—number of markers counted by a given sensor, initially 0 for all sensors;

In the following description the sensors (142-146) are enumerated such that $S_i$ denotes a sensor having an index of i (it is system dependent whether index i increases or decreases while following the engaging movement (160) as long as it is clear what is a sequence of sensors in the engaging movement). In an example shown in FIG. 3 and FIGS. 4A-C, the starting sensor has the highest index number ($S_8$) while the sensors following it in the direction of movement (160), decrease their index values ($S_7$ to $S_0$).

The method shown in FIG. 3 starts at step (301) from determining a sensor ($S_T$) having $MN_A$ of 0. Therefore $S_T$ is the first sensor positioned above the weight stack. Based on this, and the knowledge if a sequence of sensors (142-146), there may be determined a sensor $S_{T-1}$ following the $S_T$ sensor in the direction of the engaging movement (160).

Next, at step (302), the process awaits detection of a marker by the sensor $S_{T-1}$ following the $S_T$. The distance between $S_T$ and $S_{T-1}$ is considered a minimum travel distance required to count an exercise repetition. When the $S_{T-1}$ sensor has detected a marker it means that it may be determined how many weight plates (110-117) have been moved in order to later count total weight.

Subsequently, at step (303), the method determines a sensor (142-146) closest to the weight stack start (closest to the bottom in case of a vertical system or in other words closest to the starting sensor (146)) and at the same time having more than 0 detected markers. Such sensor may be marked as $S_B$ referring to a bottom sensor.

Further, at step (304), the process verifies whether the $S_B$ sensor is the starting sensor e.g. (146) taking into account said direction of an engaging movement (160) as shown in FIG. 1B.

In case it is not, the method determines (305) a number of moved markers (120-127) as:

$$M_C+MN_A+MN_O \text{ for the } S_B.$$

After step (305) the process proceeds to awaiting (306) a return of the weight plates (110-117) to the initial position.

From the equation above it stems that a travel distance required to detect weight may be reduced to the distance D when the first marker (taking the direction of engaging movement into account; i.e. sensor (143) in FIG. 1B) is positioned such that it faces a sensor.

In the case the check of step (304) is positive, the present method sets (307) a variable H as a sum of predefined heights of weight plates (see for example configuration shown in FIG. 5) preceding the starting sensor (146 in FIGS. 1A-B), which may be determined based on the number of markers (110-117) preceding the starting sensor (146 in FIGS. 1A-B) as well as the number of markers counted by the starting sensor.

Next, at step (308) the present process determines a sensor ($S_{TT}$) as the closest sensor following position $S_T$–H and awaits (309) detection of a marker by the sensor ($S_{TT}$) (MC=1).

Subsequently, the method proceeds to awaiting (306) a return of the weight plates (110-117) to the initial position.

A repetition may also be counted when the system switches from an engaging movement to a returning movement. Each repetition may be timed and time, repetitions count, travel distance and total weight may be calculated (based on system configuration) and stored in the controller (205) as well as reported to a user's device via said communication module (207).

It is clear to one skilled in the art that in order to correctly update the variables $M_C$, $MN_A$ and $MN_O$ the system must be able to detect a direction of movement (engaging or returning) of the weight plates. This may be effected by known methods, one of which is presented in the Applicant's co-pending European Patent Applications EP18461537.5 or EP19461616.5.

Figure 4A:
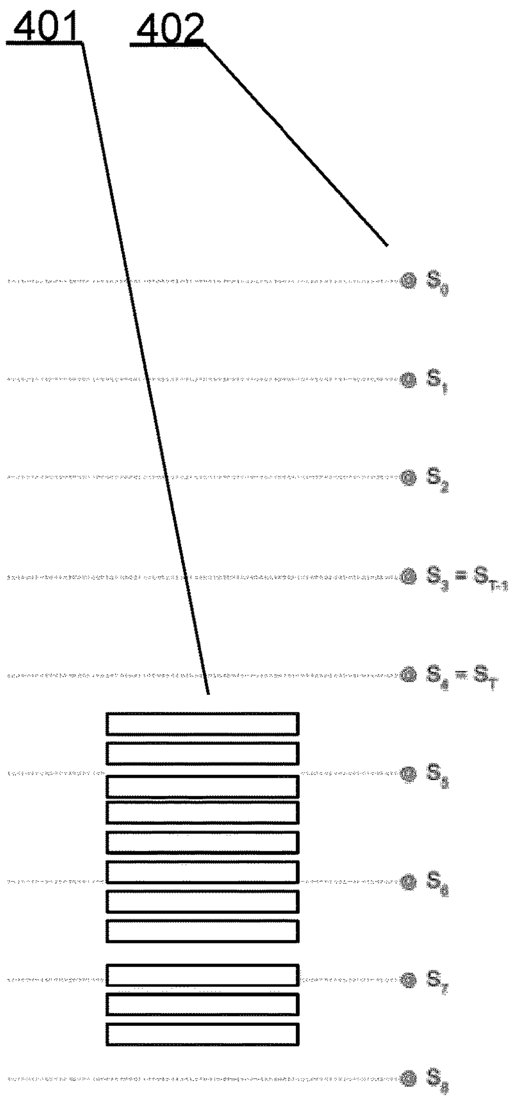
FIGS. 4A-C present system status during an example of weight stack movement.
Figure 4B:
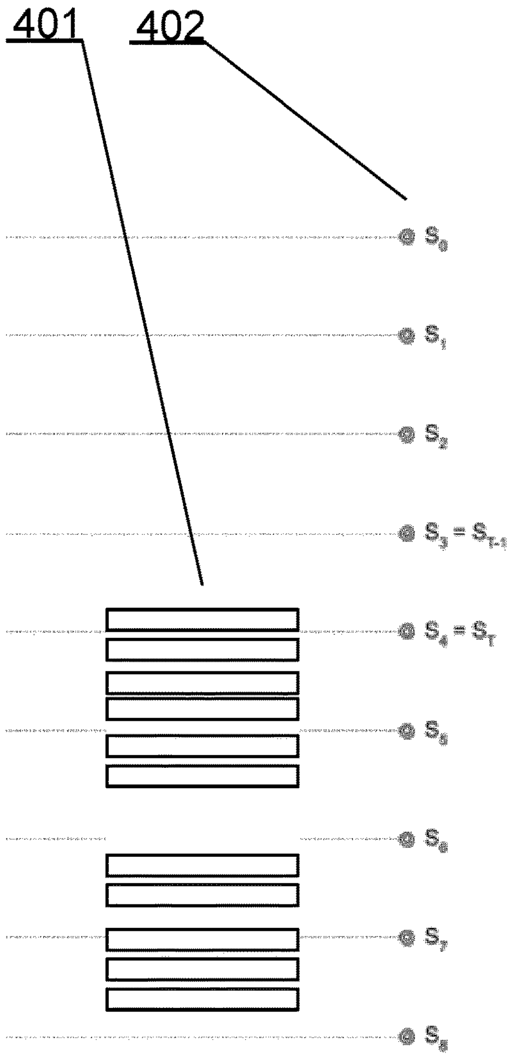
Figure 4C:
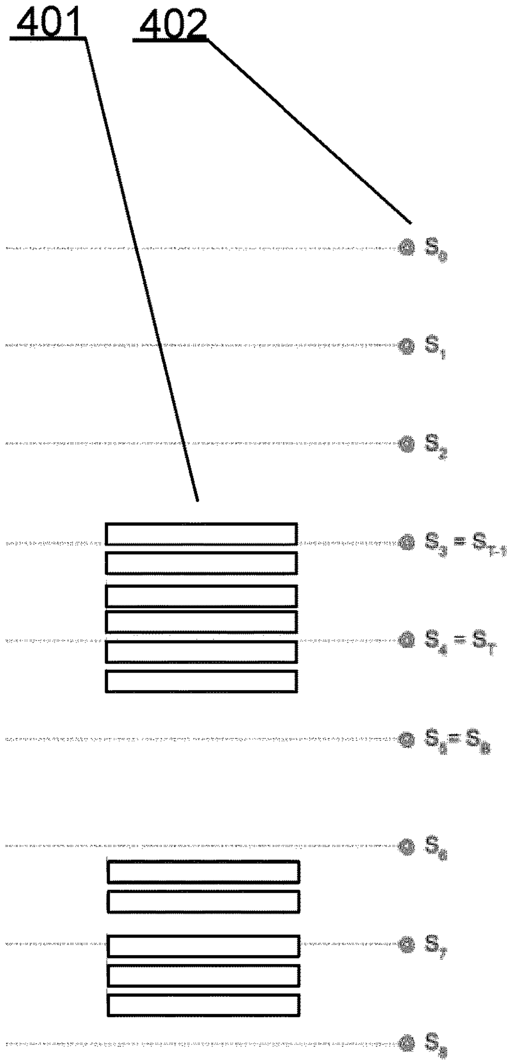

FIGS. 4A-C present system status during an example of weight stack movement. In this example there are 11 weight plates and 9 sensors.

FIG. 4A depicts an initial state wherein the start of the weight stack is just above sensor $S_8$. The $MN_A$, $MN_U$ and $MN_O$ are defined accordingly. For example, $MN_O$ is set to 1 only in case of $S_7$ while in case of all other sensors it is set to 0. This is typically a manual labor required as a system setup in its initial position at which the system is configured.

At this stage it is determined that the $S_T$ sensor is sensor $S_4$ while the $S_{T-1}$ sensor is $S_3$.

FIG. 4B depicts beginning of an engaging movement upwards of the top 6 weight plates. In this state, the $S_T$ has counted 1 marker while the $S_5$ has counted 2 markers.

FIG. 4C depicts that the movement is continued. The $S_{T-1}$ has counted 1 marker. At this stage it is determined that the $S_B$ sensor is sensor S5. Therefore, the number of moved markers may be calculated as 4 (markers counted by the $S_B$)+2 (markers above the $S_B$ in the initial state)+0 (markers on (in front of/facing) the $S_B$ in the initial state)=6.

Having the number of top 6 weight plates moved, weight may be counted (as a simple sum) based on a predefined configuration of weight plates in which each weight plate is assigned a weight that may differ between the weight plates (110-119).

Similarly, travel distance of said 6 weight plates may be measured as predefined measures of the respective 6 weight plates in the direction if the engaging movement (e.g. a sum of all heights of the 6 weight plates).

FIG. 5 shows an initial system configuration stored in memory. The configuration (500) comprises (A) information (501) on a number of markers (120-127); (B) information (502) on a sequence of said sensors (142-146); (C) information (503) on an initial setup of the system by specifying how many markers (120-127) are positioned prior to and after each sensor (142-146) taking into account the axis of movement (100).

Optionally, the configuration provides information for each sensor (142-146) whether it is facing a marker (120-127).

A detection of whether a sensor is considered as facing a marker (120-127) is implementation dependent in a sense that the facing condition may be defined within a given threshold or range, for example a marker fully within a coverage area of a sensor or a marker 95% within a coverage area of a sensor or a marker 90% within a coverage area of a sensor depending on configuration of the system. Other thresholds or ranges are also withing the scope of the present invention.

In this example a first rail (150) reports sensors S1_1 to S1_5 (142-146) in the order given while the second rail (150A) reports sensors S2_1 to S2_5 (142A-146A) in the order given.

It is also known that the first rail (150) follows the second rail (150A) in the direction of the engaging movement (160).

A distance between consecutive sensors may be given, in this case 10 cm. Correspondingly, a distance between consecutive markers may be given, in this case 5 cm (e.g. the corresponding weight plates may have the same height but different weights as specified in the configuration (504).

In case the weight plates (110-117) on which the markers (120-127) are positioned have different heights, such heights may be explicitly given as an ordered sequence of values.

In a similar manner a weight plate common weight may be given e.g. 10000 g or an ordered list of weights per the associated weight plates may be given.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, the present invention may take the form of a computer program product embodied in any tangible medium of expression having computer usable program code embodied in the medium.

It can be easily recognized, by one skilled in the art, that the aforementioned method for counting spatially arranged, moving markers may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A method for counting spatially arranged, moving markers, wherein said markers are arranged to move along a movement axis being parallel to a sensors axis of sensors configured to detect said markers during movement, whereas there are fewer sensors than markers, the method comprising the steps of:

arranging said sensors, in an initial setup, such that at least two of the sensors are arranged such that all the markers precede them taking into account an axis of movement of a direction of an engaging movement;

providing a computer implemented method comprising the steps of:

providing information on a number of said markers;

providing information on a sequence of said sensors;

providing information on the initial setup by specifying how many markers are preceding and following each sensor taking into account the axis of movement and the direction of the engaging movement;

determining a sensor $S_T$ having 0 following markers and a sensor $S_{T-1}$ following the $S_T$ sensor in the direction of the engaging movement;

awaiting detection of a marker of said markers by the sensor $S_{T-1}$;

determining a sensor $S_B$ closest to a starting sensor taking into account said direction of the engaging movement and at the same time having more than 0 detected markers;

verifying whether the $S_B$ sensor is the starting sensor and in case it is not, determining a number of moved markers as a sum of detected markers and following markers for the $S_B$;

in the case the verifying step is positive, setting a variable H as a sum of predefined heights of objects associated with said markers preceding the starting sensor based on the number of markers preceding the starting sensor as well as the number of markers counted by the starting sensor;

determining a sensor $S_{TT}$ as the closest sensor following $S_T$–H; and awaiting detection of a marker of said markers by the sensor $S_{TT}$.

2. The method according to claim 1 wherein said number of moved markers is increased by 1 when the $S_B$ is facing a marker of said markers.

3. The method according to claim 1 wherein said information on the initial setup comprises a list defining heights of all objects associated with said markers.

4. The method according to claim 1 wherein said information on the initial setup comprises a list defining weights of all objects associated with said markers whereas after said verifying step the method is configured to provide a total weight as a sum of weight of all objects associated with said moved markers.

5. The method according to claim 1 wherein the method further comprises a step of awaiting a return of weight plates to an initial position and increasing a counter of repetitions.

6. The method according to claim 1 wherein said information on the initial setup further comprises information on whether each sensor is facing a marker of said markers.

7. The method according to claim 1 wherein said sensors are mounted on at least one rail being configured to be connectable to other such rails in order to form longer rails along said sensors axis.

8. A computer program comprising program code for performing all the steps of the computer-implemented method according to claim 1 when said program is run on a computer.

9. A computer readable medium storing computer-executable instructions performing all the steps of the computer-implemented method according to claim 1 when executed on a computer.

10. A system for counting spatially arranged, moving markers, wherein said markers are arranged to move along a movement axis being parallel to a sensors axis of sensors configured to detect said markers during movement, whereas there are fewer sensors than markers, the system comprising:

a memory storing a configuration that comprises:

information on a number of said markers;

information on a sequence of said sensors;

information on an initial setup of the system by specifying how many markers are preceding and following each sensor taking into account an axis of movement and a direction of an engaging movement;

wherein at least two of the sensors are arranged in said initial setup, such that all the markers precede them taking into account the axis of movement and the direction of the engaging movement;

a controller configured to execute the steps of:

determining a sensor $S_T$ having 0 following markers and a sensor $S_{T-1}$ following the $S_T$ sensor in the direction of the engaging movement;

awaiting detection of a marker of said markers by the sensor $S_{T-1}$;

determining a sensor $S_B$ closest to a starting sensor taking into account said direction of an engaging movement and at the same time having more than 0 detected markers;

verifying whether the $S_B$ sensor is the starting sensor and in case it is not, determining a number of moved markers as a sum of detected markers and following markers for the $S_B$;

in the case the verifying step is positive, setting a variable H as a sum of predefined heights of objects associated with said markers preceding the starting sensor based on the number of markers preceding the starting sensor as well as the number of markers counted by the starting sensor;

determining a sensor $S_{TT}$ as the closest sensor following $S_T$–H; and awaiting detection of a marker of said markers by the sensor $S_{TT}$.

11. The system according to claim 10 wherein one of said sensors is arranged facing or preceding a first marker being the starting marker in said spatially arranged group of markers taking into account the direction of an engaging movement.

12. The system according to claim 10 wherein said sensors are arranged on at least two connected rails arranged along the sensors axis wherein each rail is configured to provide a report to the controller wherein such report comprises sensors identifiers and sensors sequence.

13. The system according to claim 12 wherein said controller is physically separated from said rails.

* * * * *